United States Patent [19]

Cardarelli

[11] Patent Number: 5,398,111
[45] Date of Patent: Mar. 14, 1995

[54] OPTICALLY-LOCKED FIBER-OPTIC RESONANT GYRO

[75] Inventor: Donato Cardarelli, Medfield, Mass.

[73] Assignee: The Charles Stark Draper Laboratory, Inc., Cambridge, Mass.

[21] Appl. No.: 451,737

[22] Filed: Dec. 15, 1989

[51] Int. Cl.[6] .............................................. G01B 9/02
[52] U.S. Cl. ...................................... 356/350; 372/6; 372/20; 372/32; 372/94
[58] Field of Search ...................... 356/350; 372/6, 18, 372/20, 29, 32, 94

[56] References Cited

U.S. PATENT DOCUMENTS

| | | | |
|---|---|---|---|
| 4,274,742 | 6/1981 | Lustig | 356/350 |
| 4,455,780 | 5/1984 | Burns . | |
| 4,491,413 | 1/1985 | Rashleigh . | |
| 4,530,603 | 7/1985 | Shaw et al. . | |
| 4,661,964 | 4/1987 | Haavisto | 356/350 |
| 4,702,600 | 10/1987 | Hendrich . | |
| 4,863,272 | 9/1989 | Coccoli | 356/350 |

OTHER PUBLICATIONS

"Frequency Stabilization of Semiconductor Lasers by Resonant Optical Feedback" B. Dahmani et al, Optics/-Letters/ vol. 12 No. 11/ Nov. 1987, Optical Soc. of America.

"Narrow Spectral Linewidth Semiconductor Optical-fiber Ring Laser"-Tai et al, American Institute of Physics, Appl. Phys. Lett. 49(20), 17 Nov. 1986.

"Passive Ring Resonator Method for Sensitive Inertial Rotation Measurements in Geophysics and relativity"–Sanders, et al. Optical Society of America, vol. 6 No. 11/ Nov. 1981 Optics Letter.

"Techniques for Shot-Noise-Limited Inertial Rotation Measurement Using a Multiturn Fiber Sagnac Interferometer"-Davis et al Laser Inertial Rotation Sensors (1978) SPIE Vo. 157.

"Technology Assessment of Passive Optical Gyros Part I and Overview of Concept Problems, and Approaches Part II,"-J. David Coccoli, The Charles Stark Draper Laboratory, Inc. Cambridge, Mass., Sep. 1982.

"Fiber Optic Laser Gyro Signal Detection and Processing Technique"-Martin et al,-Guided Wave Optical Systems and Devices (1978) SPIE vol. 139.

Primary Examiner—Samuel Turner
Attorney, Agent, or Firm—Lappin & Kusmer

[57] ABSTRACT

A fiber optic resonance gyroscope which has a laser diode as the coherent light source and employs direct optical feedback to that laser diode from light propagating in one direction around a fiber optic resonance ring operating in the peak resonance mode, to maintain the laser output locked to the resonance frequency of the ring. Light propagated around the fiber optical ring in the opposite direction is phase and frequency modulated before being coupled to the ring and a portion of that light exiting the ring is photodetected, the resultant electrical signal being demodulated and used as an error control signal to maintain the modulation frequency at a specific value related to the resonance frequency of the ring for light transmitted in that direction. This error control signal is taken as the gyroscope output of the system.

16 Claims, 2 Drawing Sheets

OPTICALLY-LOCKED FIBER-OPTIC RESONANT GYRO

BACKGROUND OF THE INVENTION

This invention relates in general to fiber-optic ring gyroscopes and more particularly to a low cost passive resonance ring gyroscope employing a broadband laser.

The use of a fiber optic loop or ring in either interferometer systems or passive resonance systems respectively for high resolution measurement of angular rotation rates is well known. These systems rely upon the quantitative determination of the Sagnac shift resulting from rotation of the ring. In the resonant systems narrow bandwidth laser beams are coupled to the fiber optic ring such that they travel around the ring in opposite directions. The difference in frequency of resonance for the two beams provides a measure of the Sagnac shift. A number of interferometer and resonant systems are described in the following references:

| U.S. Pat. No. | Issue Date |
| --- | --- |
| U.S. Pat. No. 4,274,742 | June 23, 1981 |
| U.S. Pat. No. 4,491,413 | January 1, 1985 |
| U.S. Pat. No. 4,661,964 | April 28, 1987 |
| U.S. Pat. No. 4,673,293 | June 16, 1987 |
| U.S. Pat. No. 4,702,600 | October 27, 1987 |

ARTICLES

"*Fiber Optic Laser Gyro Signal Detection and Processing Technique*" by Martin and Winkler, SPIE Vol. 139, Guided Wave Optic Systems and Devices (1978), pp. 98–102;

"*Techniques For Shot-Noise-Limited Inertial Rotation Measurement Using A Multiturn Fiber Sagnac Interferometer*" by Davis and Ezekiel, SPIE Vol. 157 Laser Inertial Rotation Sensors (1978) pp. 131–136;

"*Technology Assessment of Passive Optical Gyros, Part I, Overview of Concepts, Problems, and Approaches*" by Coccoli, September, 1982;

"*Passive Ring Resonator Method for Sensitive Inertial Rotation Measurements in Geophysics and Relativity*" Saunders, Prentiss and Ezekiel, Optics Letters, Vol. 6, No. 11, pp. 569–571;

In general in a resonant fiber optic ring gyroscope a high coherence laser light source is coupled to the fiber-optic ring through optical waveguides which introduce counterpropagating light beams into the fiber optic ring. Photodetectors are used to measure a portion of each of these light beams emanating from the ring. According to the Sagnac effect, rotation of the ring changes the effective path length for light, thereby changing the resonant frequency. A number of beam modulation and phase shift techniques have been employed to determine the value of this frequency change.

In order to provide the required narrow line laser output, such systems have employed gas or crystal lasers. Laser diodes have been regarded as exhibiting too broad a bandwidth for use in Sagnac shift systems. However, laser diodes provide both low cost and light weight and, on this basis, their use would be highly desirable. One technique which has been developed for producing a narrow band (high coherence) output beam from a laser diode, by means of a Fabry-Perot resonator is described in an article entitled Frequency Stabilization of Semiconductor Lasers by Resonant Optical Feedback, authored by B. Dahmani et al, which appears in Volume 12, No. 11 of Optics Letters, November, 1987.

SUMMARY OF THE INVENTION

Broadly speaking, in the present invention a laser diode having a relatively broadband (low coherence) output beam is passed through an optical splitter to generate in a fiber optic ring two oppositely propagating light beams of substantially equal intensity. An optical isolator is employed in the path between the laser diode and the fiber optic ring to prevent optical feedback from the ring back through the splitter to the laser diode. The fiber optic ring is operated in the peak resonance mode with a coupler which provides direct optical coupling of a portion of the light traveling around the ring in a first direction to the laser diode, and a portion of the light traveling around the ring in the opposite direction to a photodetector. The light from the splitter which propagates around the ring in a direction opposite to the first direction is phase and frequency modulated between the splitter and the ring. The phase modulation is done to generate carrier and sidebands for FM heterodyne signal processing in order to detect ring resonance peak center. The frequency modulation may be of the serrodyne-type whereby $2\pi$ phase change ramps are repeated at the frequency rate determined by the error found using the FM heterodyne technique. This error signal represents the shift in resonance frequency introduced by rotation of the fiber optic ring.

In operation, the diode laser center frequency is locked by the direct optical feedback to the resonance frequency of the fiber optic ring for light passing around it in the first direction. Rotation of the fiber optic ring then introduces a different resonance peak for modulated light passing around the fiber optic ring in a direction opposite to the first direction. Intensity of this light is detected at the photodetector and demodulated to generate a control signal which is passed to the optical frequency modulator to maintain the modulated frequency in a fixed relation to the detected resonance frequency. The value of this control signal is indicative of the value of the Sagnac shift and hence of the rotation of the ring. This same modulated beam may simultaneously be suppressed carrier phase modulated before entering the fiber optic ring in order to avoid back scattering interference such as might be due to Rayleigh phenomena. Once one direction of the ring is locked to the laser diode its linewidth is reduced also. Therefore the light which propagates in the opposite direction of the ring is narrow and of high coherence.

DESCRIPTION OF PREFERRED EMBODIMENTS

Figure 1:
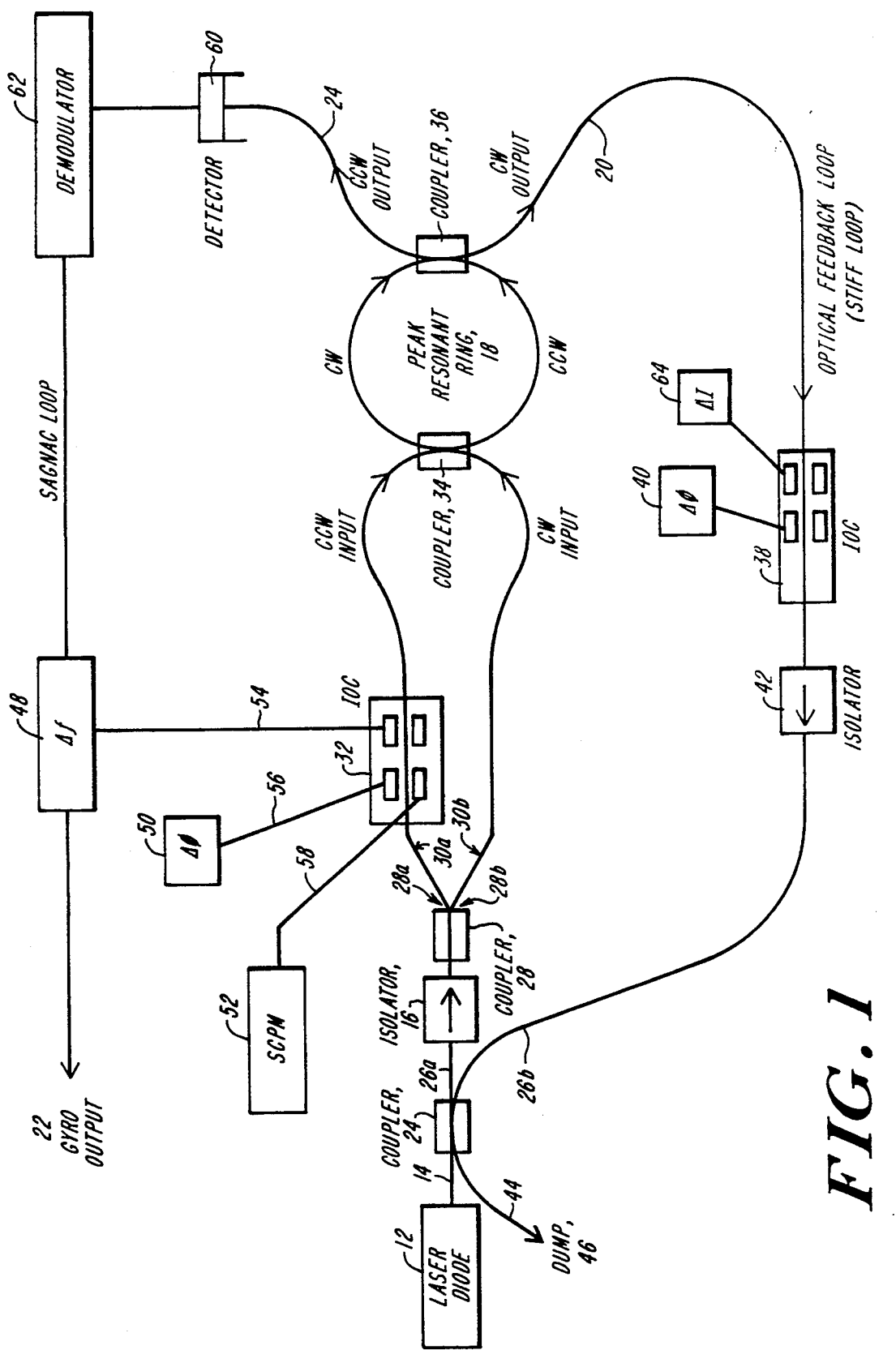
FIG. 1 is an illustration generally in block diagrammatic form of a fiber optic gyroscope constructed in accordance with the principles of this invention.

FIG. 1 shows a resonant fiber optic gyroscope (RFOG) 10 of the present invention. As depicted in FIG. 1, device 10 is a peak RFOG with optically coupled feedback to laser source 12. In this embodiment, a broadband (low coherence) laser diode source 12 has an output path 14 which is coupled through a feedback isolator 16 into a fiber optic resonant ring 18 of the peak type, used as an inertial sensor. The laser diode source 12 is locked to the clockwise (CW) resonance of the ring 18 by initially current-tuning the laser source 12 such that its center frequency is close to that of the CW ring resonance. Optical feedback from the ring 18, transmitted through stiff feedback loop 20 to the laser diode 12, then takes over to establish and maintain the frequency lock between laser source 12 and the CW ring resonance. In this way the line spectrum of laser diode source 12 is substantially narrowed thus enabling the use of a relatively low cost, broadband laser such as a HLP 1400's manufactured by Hitachi. The gyroscope output signal 22 is derived from electrical signals produced in the soft feedback loop 24 to maintain the modulation frequency for counterclockwise (CCW) beam at the ring resonance frequency for the CCW light propagation. These signals are subjected to signal processing of known type such as heterodyne modulation, mixing and demodulation in order to detect a frequency shift indicative of ring rotation.

As shown in FIG. 1, laser source 12 comprises a broadband (low coherence) laser diode. Laser source 12 injects broadband light along path 14 through optical coupler 24. Coupler 24, having dual output ports 26a and 26b, provides a high percentage of the light through port 26a and directional optical isolator 16 to the input port of optical coupler 28. Coupler 28 splits the light evenly at output ports 28a and 28b to provide light along paths 30a and 30b respectively. Viewed from the input sense, the signals travelling in paths 30a and 30b will be referred to as the CCW input path and the CW input path respectively, since, as is apparent from FIG. 1, the forward travelling light in path 30a is passed through integrated optical circuit 32 and is coupled via optical coupler 34 into ring 18 in the counterclockwise direction and the forward travelling light in path 30b is coupled via optical coupler 34 into ring 18 in the CW direction.

THE OPTICAL FEEDBACK LOOP (STIFF LOOP)

The light injected into ring 18 in the CW direction takes part in ring resonance, after which, part of this light exits ring 18 through optical coupler 36. The exiting light travels along optical feedback path 20 to integrated optical circuit 38 which adjusts the phase and intensity of the returning light, if needed, to optimize the phase of the optical feedback with the phase of laser source 12. Phase adjustment is controlled by phase modulator 40. The integrated optical circuit 38 then passes the adjusted light signal through directional isolator 42 to optical coupler 24 via path 26b. Coupler 24 again splits the light sending a small percentage of it to laser source 12 and the remainder along path 44 to a dump 46, where the intensity can be monitored. Laser source 12 is thereby locked to the CW ring resonance. The amount of light returned back to laser source 12 is required to fall within a "weak" regime in order to preserve the stability of laser source 12.

As stated above, the laser source 12 is locked to the CW resonance of ring 18 by initially current-tuning laser source 12 such that its center frequency is close to that of the CW ring 18 resonance. The optical signal fed back from coupler 36 along feedback path 20 then takes over and slaves the laser source 12 to the CW ring 18 resonance. In a preferred embodiment, slaving occurs even though the natural frequency of the laser source 12 would normally tend to vary with changes in laser current. Moreover, the locking pervades over a locking range in excess of a GHz once laser 12 is initially rough current tuned so that its natural frequency is somewhere within the locking range.

THE ELECTRO-OPTICAL LOOP (THE SAGNAC LOOP)

The light, prior to being injected into the CCW path of ring 18 passes from output port 30a of coupler 28 through integrated optical circuit 32. Circuit 32 accepts control inputs from frequency modulator circuit 48, phase modulator circuit 50 and suppressed carrier phase modulator 52. Frequency modulator 48 which typically could be a serrodyne driver, provides optical circuit 32 with an electrical error control signal 54 derived from the Sagnac feedback loop 24. Signal 54 drives the integrated optics circuit 32 to perform frequency shifting on the light traveling in the CCW path of ring 18 thus causing the frequency of the light in the CCW path to track the center frequency of the CCW peak ring resonance. The frequency of modulation is on the order of up to tens of KHz, making electronics processing relatively simple. The measure of this frequency shift is related to inertial ring rotation and is provided by frequency modulator 48 to gyroscope output 22. Phase modulator 50 provides circuit 32 with a sinusoidal voltage signal in order to establish sidebands necessary for heterodyne signal processing. Suppressed carrier phase modulator 52 provides signal 58 to optical circuit 32. Signal 58, in conjunction with circuit 32, suppress carrier modulates the light flowing in the CCW path thereby avoiding the CW to CCW coupling usually associated with RFOG designs as well as enabling Rayleigh backscatter and thermal drifts to be taken care of using conventional RFOG circuit designs. The suppressed carrier phase modulation may need to be done at two frequencies to sufficiently eliminate the carrier frequency.

After passing through integrated optical circuit 32 the CCW beam enters ring 18 through coupler 34. Once in the ring the CCW beam takes part in ring resonance and a portion exits onto Sagnac feedback path 24 via optical coupler 36. Sensor 60, which is a typical intensity detector, converts the optical signal exiting onto path 24 into an electrical signal which is then demodulated by demodulator 62. As predicted by the Sagnac affect and commonly known in the art, the CCW output travelling along feedback path 24 is indicative of the difference between the frequency of light travelling in the CCW and CW directions in ring 18. As such, once converted from an optical to an electrical signal and demodulated, it is used as an error input to control frequency modulator 48. As previously discussed, frequency modulator 48 translates the error signal derived from feedback path 24 into control signal 54 which interfaces with integrated optical circuit 32 and facilitates matching the frequency of the CCW input to resonant ring 18. As also discussed above, frequency modulator 48 translates this signal into gyroscopic output 22. Output 22 being indicative of gyroscopic rotation.

It will be observed that in the architecture of the device of FIG. 1, all elements associated with feedback path 24 are conventional. Significantly, however, feedback path 20, dedicated to locking the laser source 12 to the ring resonance, is performed entirely with optical components. This feature of the invention eliminates the need for electrical detection/conversion, demodulation, and electrical feedback to the laser and enables usage of a broadband relatively inexpensive laser diode source. In this system the phase modulation frequency, $\Delta\phi$, can be less than the ring resonance line width owing to the newly reduced frequency noise. Modulation and detection is necessary for only one direction of light travel around the ring with resulting decrease in components.

Such a system is particularly useful in commercial applications whenever a low cost, simple, light weight gyroscope can be used. These include cars, small boats and small planes.

Figure 2:
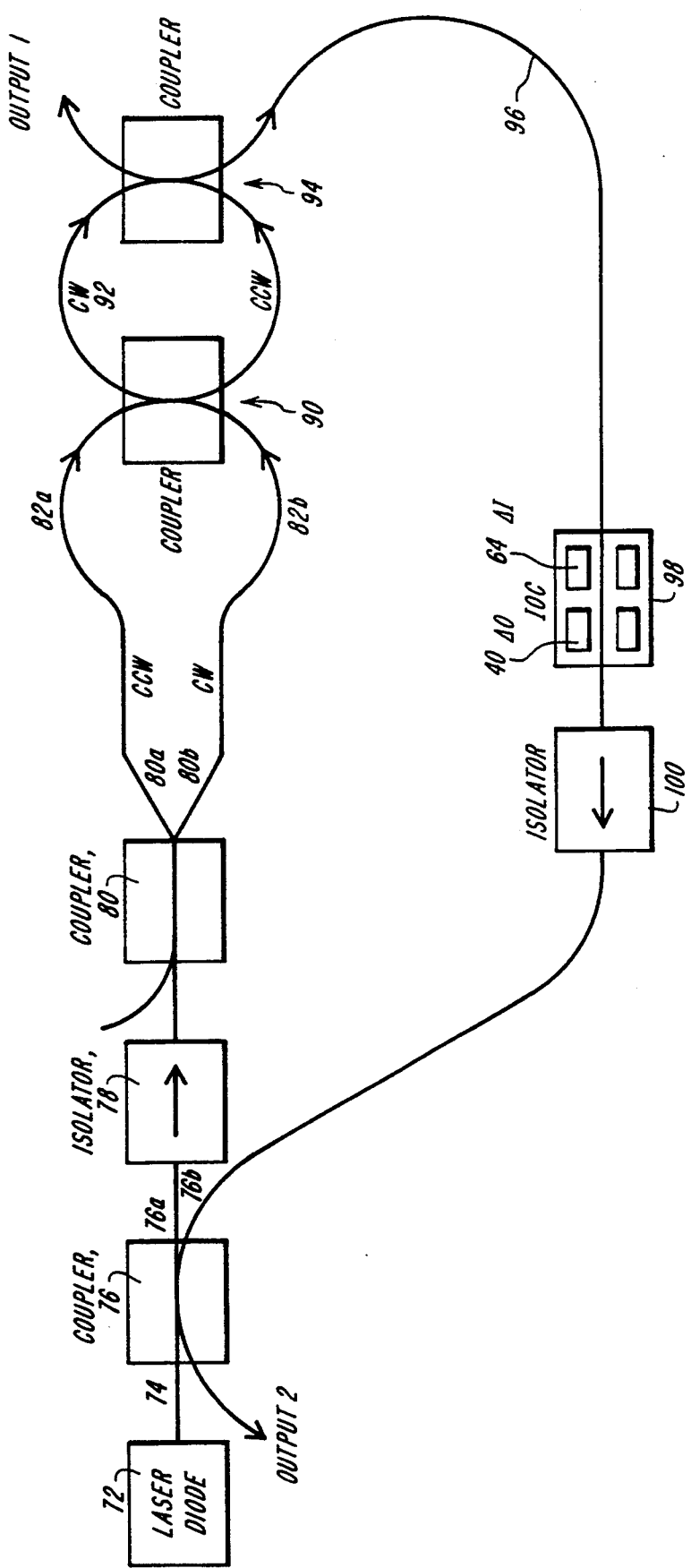
FIG. 2 is an illustration in block diagrammatic form of a resonator controlled laser diode source constructed in accordance with the principles of this invention.

In an alternative embodiment of the invention, FIG. 2 shows resonator-controlled laser diode source 70. In this embodiment, the peak FORG of FIG. 1 is modified to serve only the function of narrowing the line width of a commercial laser diode 72 and stabilizing its central frequency. As shown in FIG. 2, laser source 72 injects broadband light along path 74 through coupler 76. Coupler 76, having dual outputs 76a and 76b, directs approximately 99% of the light through port 76a and directional isolator 78 to optical coupler 80. Coupler 80 splits the light evenly at output ports 80a and 80b along paths 82a and 82b respectively. Viewed in the input sense, these will be referred to as the CCW input path and the CW input path, since, as is apparent from FIG. 2, the forward travelling light in these paths couples via coupler 90 into ring 92 in counterclockwise and clockwise senses, respectively.

As in the embodiment of FIG. 1, the CW propagating light wave takes part in ring resonance and partially exits ring 92 through coupler 94 onto optical feedback path 96. Also, as in the FIG. 1 embodiment this optical feedback is returned through integrated optical circuit 98, isolator 100, and coupler 76 to laser source 72 in order to preserve the stability of the laser source 72 and to narrow the line width of the laser. However, unlike the embodiment of FIG. 1, the CCW output from ring 92 is coupled to a second RFOG or to any sensor requiring high laser coherence via coupler 94. In this way the present invention provides a stable, relatively inexpensive, narrow band laser source for a second RFOG.

Having described these embodiments, variations and modifications will occur to those skilled in the art, and all such variations and modifications are considered to be within the scope of the invention in which patent rights are claimed, as defined by the claims appended hereto.

I claim:

1. A fiber optic resonance gyroscope comprising,
   a laser source;
   a fiber optic ring;
   optical guide means coupling said laser source to said fiber optic ring for splitting the output beam from said laser source into two beams of substantially equal intensity, a first one of said split beam being propagated around said fiber optic ring in a first direction and a second one of said split beams being propagated around said fiber optic ring in the opposite direction;
   a frequency modulator positioned to modulate said second one of said split beams;
   means for applying a control signal to said frequency modulator to control the modulation frequency thereof;
   isolator means blocking light from said optical guide means from passing back through it to said laser source;
   said laser source being tuned such that its center frequency is close to the resonant frequency of said fiber optic ring for light traveling around said ring in said first direction;
   an optical coupler coupled to said fiber optic ring and having first and second output ports said optical coupler providing at its first output port a portion of the light traveling around said ring in said first direction, said first output port being optically coupled to said laser source such that the center frequency of said laser source is locked to the resonance frequency of said ring for light traveling around it in said first direction;
   a sensor providing an electrical output signal in response to the intensity of light impinging thereon;
   a portion of light traveling around said ring in the direction opposite to said first direction exiting said optical coupler at said second output port, said second output port being optically coupled to said sensor;
   a phase demodulator coupled between said sensor means and said frequency modulator to provide a control signal to maintain a predetermined frequency relationship between the frequency of the light entering said optical guide means and the resonance peak of said fiber optic ring for light traveling around said ring in the direction opposite to said first direction; and
   output means comprising an output signal which varies in accordance with variations in said control signal as an indication of rotation of said fiber optic ring.

2. Apparatus in accordance with claim 1 and further including a suppressed carrier phase modulator coupled to additionally modulate said second one of said split beams before it is coupled into said fiber optic ring.

3. Apparatus in accordance with claim 1 and further including a phase modulator coupled to additionally modulate said second one of said split beams before it is coupled into said fiber optic ring in order to sense the ring peak resonance center and provide a signal for demodulation.

4. A fiber optic gyroscope in accordance with claim 1 wherein said resonant ring is operated in the peak mode.

5. A fiber optic resonance gyroscope comprising,
   a laser source;
   a fiber optic ring;
   a first optical coupler coupled to the output of said laser source and having first and second output ports;
   a second optical coupler coupled to one output port of said first optical coupler and having first and second output ports;
   a third optical coupler having first and second input ports and first and second output ports
   first optical path means coupling said second optical coupler first output port to said third optical coupler first input port and second optical path means coupling said second optical coupler second output port to said third optical coupler second input port;
   isolator means blocking light from said second optical coupler from passing back through said first optical coupler to said laser source;
   the output from said third optical coupler being coupled to said fiber optic ring such that a portion of said laser beam travelling along said first optical path means travels in a first direction around said optical fiber ring and a portion of said laser beam traveling along said second optical path means travels in the direction opposite to said first direction around said fiber optic ring;

said laser source being tuned such that its center frequency is close to the resonance frequency of said fiber optic ring for light travelling around said ring in said first direction;

a fourth optical coupler coupled to said fiber optic ring and having first and second output ports, said fourth optical coupler providing at its first output port a portion of the light travelling around said ring in said first direction, said fourth optical coupler first output port being optically coupled through said first optical coupler to said laser source such that the center frequency of said laser source is locked to the resonance frequency of said ring for light travelling in said first direction;

a sensor providing an electrical output signal in response to the intensity of light impinging thereon;

a portion of light travelling around said ring in the direction opposite to said first direction exiting said fourth coupler at its second output port, said second output port being optically coupled to said sensor;

an optical frequency modulator positioned to modulate light passing along said second optical path means;

means for applying a control signal to said frequency modulator to control the modulation frequency;

a phase demodulator being coupled between said sensor means and said means for applying a control signal, to maintain a predetermined frequency relationship between the frequency of the light entering said second optical path and the resonance peak of said fiber optic ring for light travelling along said ring in the direction opposite to said first direction;

output means comprising an output signal which varies in accordance with variations in said control signal as an indication of rotation of said fiber optic ring.

6. A resonance gyroscope in accordance with claim 5 and further including an isolator between the first output port of said fourth coupler and the second output port of said first coupler to prevent optical feedback from said first coupler to said fourth coupler.

7. A resonance gyroscope in accordance with claim 6 and further including in the path between said first output port of said fourth coupler and the second output port of said first coupler an integrated optical element having means for controlling the phase of light travelling from said first output port toward said second output port of said first coupler.

8. A resonance gyroscope in accordance with either of claims 6 or 7 and further including in the path between said first output port of said fourth coupler and the second output port of said first coupler means for controlling the intensity of light travelling from said first output port of said fourth coupler toward said second output port of said first coupler.

9. A method of measuring the angular rate of rotation of a fiber optic ring comprising the steps of:

(1) generating a laser beam having a center frequency close to a resonant frequency of said fiber optic ring for light traveling around it in a first direction from a relatively broad band laser source;

(2) splitting said laser beam into two substantially equal intensity beams;

(3) coupling a first one of said split laser beams into said fiber optic ring to propagate in said first direction around said ring;

(4) coupling the second one said split laser beams into said fiber optic ring to propagate in the opposite direction around said ring;

(5) locking the center frequency of said laser beam to a peak resonant frequency of light traveling around said fiber ring in a first direction by, direct optical coupling of a portion of light traveling around said fiber optic ring in said first direction to said relatively broad band laser source;

(6) frequency modulating said second one of said split laser beams before said split laser beam is coupled into said fiber optic ring;

photodetecting a portion of modulated light propagated around said fiber optic ring in the direction opposite to said first direction to provide an output electrical signal which varies with variations in phase and intensity of said photodetected portion;

demodulating the output signal from said photodetecting step and using it as a control signal for controlling the frequency of said split beam; and taking the variations in value of said control signal as indicative of the measure of rotation of said fiber optic ring.

10. A laser source for use in a fiber optic resonance gyroscope comprising, a broad band laser;

a fiber optic ring;

optical guide means coupling said laser to said fiber optic ring for splitting the output beam from said laser source into two beams of substantially equal intensity, a first one of said split beam being propagated around said fiber optic ring in a first direction and a second one of said split beams being propagated around said fiber optic ring in the opposite direction;

isolator means blocking light from said optical guide means from passing back through it to said laser source;

said broad band laser being tuned such that its center frequency is close to the resonant frequency of said fiber optic ring for light traveling around said ring in said first direction;

an optical coupler coupled to said fiber optic ring and having first and second output ports said optical coupler providing at its first output port a portion of the light traveling around said ring in said first direction, said first output port being optically coupled to said laser source such that the center frequency of said laser source is locked to the resonance frequency of said ring for light traveling around it in said first direction;

a portion of light traveling around said ring in the direction opposite to said first direction exiting said optical coupler at said second output port; and said portion of light exiting said second output port being a stable, relatively narrow band, coherent light source at a center frequency equal to the resonant frequency of said fiber optic ring.

11. A laser source in accordance with claim 10 wherein said broad band laser is a laser diode.

12. A laser source for use in a fiber optic resonance gyroscope comprising, a broad band laser;

a fiber optic ring;

a first optical coupler coupled to the output of said laser source and having first and second output ports;

a second optical coupler coupled to one output port of said first optical coupler and having first and second output ports;

a third optical coupler having first and second input ports and first and second output ports;

first optical path means coupling said second optical coupler first output port to said third optical coupler first input port and second optical path means coupling said second optical coupler second output port to said third optical coupler second input port;

isolator means blocking light from said second optical coupler from passing back through said first optical coupler to said laser source;

the output from said third optical coupler being coupled to said fiber optic ring such that a portion of said laser beam travelling along said first optical path means travels in a first direction around said optical fiber ring and a portion of said laser beam traveling along said second optical path means travels in the direction opposite to said first direction around said fiber optic ring;

said broad band laser being tuned such that its center frequency is close to the resonance frequency of said fiber optic ring for light travelling around said ring in said first direction;

a fourth optical coupler coupled to said fiber optic ring and having first and second output ports, said fourth optical coupler providing at its first output port a portion of the light travelling around said ring in said first direction, said fourth optical coupler first output port being optically coupled through said first optical coupler to said broad band laser such that the center frequency of said laser is locked to the resonance frequency of said ring for light travelling in said first direction;

a portion of light travelling around said ring in the direction opposite to said first direction exiting said fourth coupler at its second output port; and said portion of light exiting said second output port being a stable, relatively narrow band, coherent light source at a center frequency equal to the resonant frequency of said fiber optic ring.

13. A laser source in accordance with claim 12 wherein said broadband laser is a laser diode.

14. A laser source in accordance with claim 12 and further including an isolator between the first output port of said fourth coupler and the second output port of said first coupler to prevent optical feedback from said first coupler to said fourth coupler.

15. A laser source in accordance with claim 12 and further including in the path between said first output port of said fourth coupler and the second output port of said first coupler an integrated optical element having means for controlling the phase of light travelling from said first output port toward said second output port of said first coupler.

16. A laser source in accordance with any one of claims 12, 14 or 15 and further including in the path between said first output port of said fourth coupler and the second output port of said first coupler means for controlling the intensity of light travelling from said first output port of said fourth coupler toward said second output port of said first coupler.

* * * * *